(12) United States Patent
An

(10) Patent No.: US 9,910,306 B2
(45) Date of Patent: Mar. 6, 2018

(54) DISPLAY DEVICE AND SET ELECTRONIC DEVICE INCLUDING THE DISPLAY DEVICE

(71) Applicant: LG Display Co., Ltd., Seoul (KR)

(72) Inventor: SuYoung An, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 14/941,892

(22) Filed: Nov. 16, 2015

(65) Prior Publication Data

US 2016/0187710 A1  Jun. 30, 2016

(30) Foreign Application Priority Data

Dec. 26, 2014  (KR) .................. 10-2014-0190143

(51) Int. Cl.
*G02F 1/1333* (2006.01)
*G02F 1/1335* (2006.01)

(52) U.S. Cl.
CPC .................. *G02F 1/133308* (2013.01); *G02F 2001/133317* (2013.01)

(58) Field of Classification Search
CPC ......... G02F 1/133615; G02F 1/133308; G02F 2001/133317; G02F 1/133608; G02F 2201/46; G02F 1/1333; G02F 2001/133342; G02B 6/008; G02B 6/0091; G02B 6/0088; G02B 6/0055; G02B 6/009; G02B 6/0031; G02B 6/0071; G06F 1/1616; G06F 1/1637
See application file for complete search history.

(56) References Cited

U.S. PATENT DOCUMENTS

| | | | | |
|---|---|---|---|---|
| 6,919,940 B2* | 7/2005 | Noh | .................. | G02F 1/133615 349/58 |
| 7,663,713 B2* | 2/2010 | Saito | .................... | G02B 6/0038 349/62 |
| 8,416,367 B2* | 4/2013 | Son | .................... | G02F 1/133608 349/60 |
| 2008/0079863 A1* | 4/2008 | Jung | .................... | G02B 6/0086 349/58 |
| 2015/0362787 A1* | 12/2015 | Yuan | ................. | G02F 1/133308 349/58 |

FOREIGN PATENT DOCUMENTS

| | | |
|---|---|---|
| CN | 102679285 A | 9/2012 |
| CN | 102809836 A | 12/2012 |
| CN | 104062782 A | 9/2014 |
| TW | 200706946 A | 2/2007 |
| TW | M486808 U | 9/2014 |

OTHER PUBLICATIONS

Office Action dated Aug. 17, 2016 from the Taiwanese Patent Office in counterpart Taiwanese application No. 10521011530.

* cited by examiner

*Primary Examiner* — Huyen Ngo
(74) *Attorney, Agent, or Firm* — Morgan, Lewis & Bockius LLP

(57) ABSTRACT

A display device includes a display panel, a back light unit configured to provide light to the display panel, and a guide panel covering side surfaces of the display panel and the back light unit. The guide panel includes a dual partition wall structure of an inner partition wall and an outer partition wall, a first extension that is extending from and integral with the dual partition wall structure, and a second extension protruding in a direction perpendicular to the dual partition wall structure to be between the back light unit and the display panel.

13 Claims, 12 Drawing Sheets

DISPLAY DEVICE AND SET ELECTRONIC DEVICE INCLUDING THE DISPLAY DEVICE

CROSS-REFERENCE TO RELATED APPLICATION

This application claims priority from and the benefit under 35 U.S.C. § 119(a) of Korean Patent Application No. 10-2014-0190143, filed on Dec. 26, 2014, which is hereby incorporated by reference for all purposes as if fully set forth herein.

BACKGROUND OF THE INVENTION

Field of the Invention

The present invention relates to a display device, and more particularly, to a display device having a guide panel that supports a side surface of a back light unit or a display panel of the display device.

Description of the Related Art

As the information-oriented society has been developed, demands for display devices for displaying images have increased in various forms, and recently, various display devices, such as a liquid crystal display (LCD) device, a plasma display panel (PDP) device, and an organic light emitting display (OLED) device.

Among the display devices, the liquid crystal display device includes, for example, an array substrate including a thin film transistor serving as a switching element for on/off control of each pixel region, an upper substrate including, for example, a color filter and/or a black matrix, a display panel including a liquid crystal material layer and formed between the switching element and the color filter and/or the black matrix, a driving unit for controlling the thin film transistor, and a back light unit (BLU) that provides light to the display panel, in which an arrangement state of the liquid crystal layer is adjusted according to an electric field applied between a pixel (PXL) electrode and a common voltage (Vcom) electrode, which are provided in the pixel region and hence the light transmittancy is adjusted so that an image is displayed.

Such a liquid crystal display device should be provided with a back light device that provides light from the outside. The back light unit may include sub-units, such as a light source, a light guide plate, a reflecting plate, and an upper sheet. The back light unit includes one or more frames or chassis serving as a support structure for mounting the sub-units thereon.

In addition to a metal chassis or a cover bottom that supports the rearmost portion and a side surface portion of the back light unit, the liquid crystal display device may include a plastic chassis or guide panel made of a plastic material which is coupled with the cover bottom fix a display panel, such as a liquid crystal display panel, thereon.

In addition, the liquid crystal display device may include a case top formed to surround the side portion of the cover bottom and to extend to a portion of the front region of the display panel to serve as a member for protecting a front edge region of the display panel.

In addition, an electronic device manufactured as a display device, such as a television or a monitor, may be referred to as a set electronic device or a set device. The set electronic device may include a set middle cover that encloses an outer peripheral portion of the display device, a circuit frame, on which a set drive circuit is mounted, and a set rear cover that covers the entire rear side so as to protect the circuit frame at the rear side.

Since the set electronic device including the display device requires, for example, the set middle frame that encloses the entire outer peripheral portion of the display device, and the set rear cover that covers the entire rear side, the number of parts increases so that costs increase and assembly convenience is more difficult.

The present invention has been made in consideration of these problems, and optimizes the shapes of a guide panel and a cover bottom that supports a back light unit or a display panel of a display device so that the guide panel can be used as a side exterior portion of the set electronic device. As a result, the set middle cover of the set electronic device can be removed and the size of the set rear cover can be reduced.

SUMMARY

Accordingly, the present invention is directed to a display device and a set electronic device that substantially obviate one or more of the problems due to limitations and disadvantages of the related art.

An object of the present invention is to provide a display device and a set electronic device with simplified structure, reduced costs, and improved assemblability.

Another object of the present invention is to provide a display device and a set electronic device where a size of the rear cover can be reduced.

Another object of the present invention is to provide a display device and a set electronic device such that light leakage at a joint of a cover can be reduced.

Additional features and advantages of the invention will be set forth in the description which follows, and in part will be apparent from the description, or be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises a display panel; a back light unit configured to provide light to the display panel; and a guide panel covering side surfaces of the display panel and the back light unit, such that the guide panel includes a dual partition wall structure of an inner partition wall and an outer partition wall, a first extension that is extending from and integral with the dual partition wall structure, and a second extension protruding in a direction perpendicular to the dual partition wall structure to be between the back light unit and the display panel.

In another aspect, a set electronic device comprises a display device including a display panel, a back light unit configured to provide light to the display panel, and a guide panel covering side surfaces of the display panel and the back light unit, such that the guide panel includes a dual partition wall structure of an inner partition wall and an outer partition wall, a first extension that is extending from and integral with the dual partition wall structure, and a second extension protruding in a direction perpendicular to the dual partition wall structure to be between the back light unit and the display panel; a set drive circuit frame mounted on a portion of a rear surface of the display device, and a set rear cover coupled to the rear side of the display device configured to cover the portion where the set drive circuit frame is mounted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A and 5B are views illustrating a set electronic device according to an embodiment of the present invention, in which FIG. 5A is a perspective view and FIG. 5B is a plan view;

DETAILED DESCRIPTION OF THE ILLUSTRATED EMBODIMENTS

Figure 1:
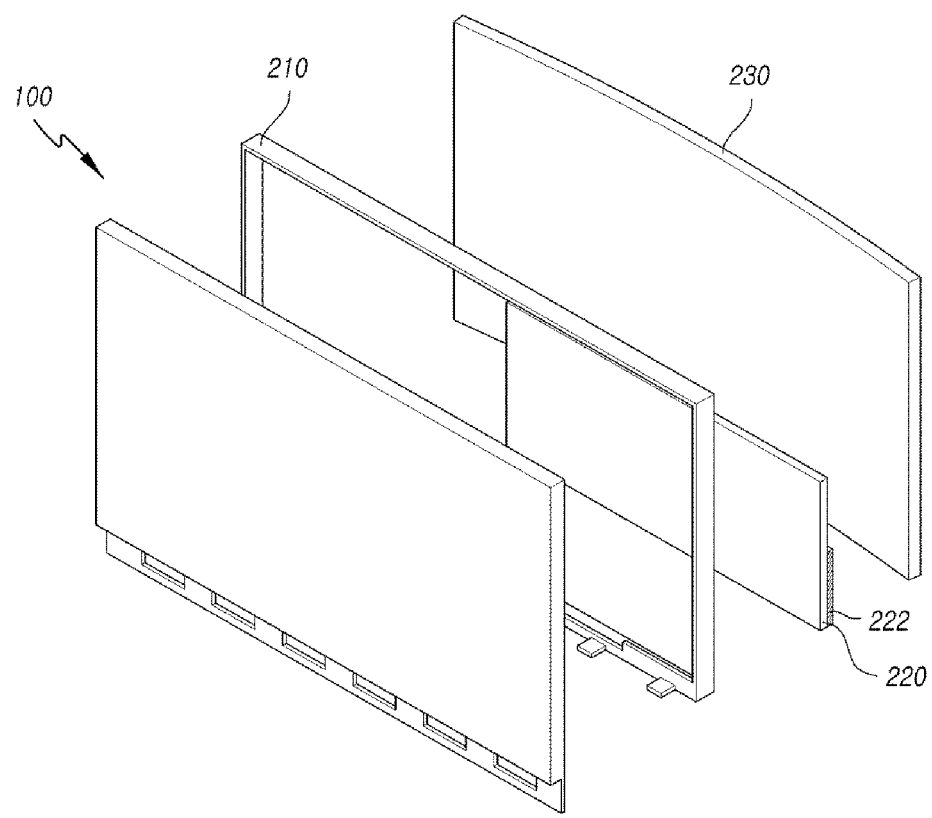
FIG. 1 is an exploded perspective view illustrating a set electronic device having a related art display device.

Hereinafter, examples of the present invention will be described in detail with reference to illustrative drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is an exploded perspective view illustrating a set electronic device including a related art display device.

As illustrated in FIG. 1, a set device including a related art display device, to which the present invention is applicable, generally includes a display device 100, such as a liquid crystal module (LCM), a set middle cover 210 made of a plastic material and enclosing an edge region of the display device, a set circuit frame 220, on which, for example, a set drive circuit 222 is mounted, and a set rear cover 230 that covers the entire surface of the display device.

The display device 100 is typically a liquid crystal display device, but is not limited thereto, and all kinds of display devices, such as a plasma display panel (PDP) device, and an organic light emitting display (OLED) device, may be used.

A detailed configuration of the display device 100 will be described in more detail below with reference to FIGS. 2A and 2B.

The term, a "set electronic device" or a "set device" is used herein to generally refer to all the electronic devices in which a display device is used, and is a concept including, for example, all of a television, a computer monitor, and a mobile electronic device, such as a smart phone or an electronic pad.

As illustrated in FIG. 1, to configure the set electronic device, for example, a set middle cover 210, a set circuit frame 220, and a set rear cover 230 are used in addition to the display device 100.

The set middle cover 210 is a plastic member that covers all the non-smooth side surfaces of the display device 100 and a part of the rear surface of the display device, and takes a form of a rectangular frame having a cross section of a "⊐" shape.

The set circuit frame 220 is a metal frame on which, for example, a driving circuit for driving the set device is mounted. The set circuit frame 220 is attached to the rear surface of the display device and is protected by the set rear cover. Typically, the set circuit frame has a size that occupies a part of the lower portion of the rear surface of the set device.

The set rear cover 230 is a member that covers the entire rear surface of the set device to protect a set drive circuit therein or the rear side of the display device. Typically, the set rear cover 230 is formed as a plastic plate member having a curved shape.

Figure 2A:
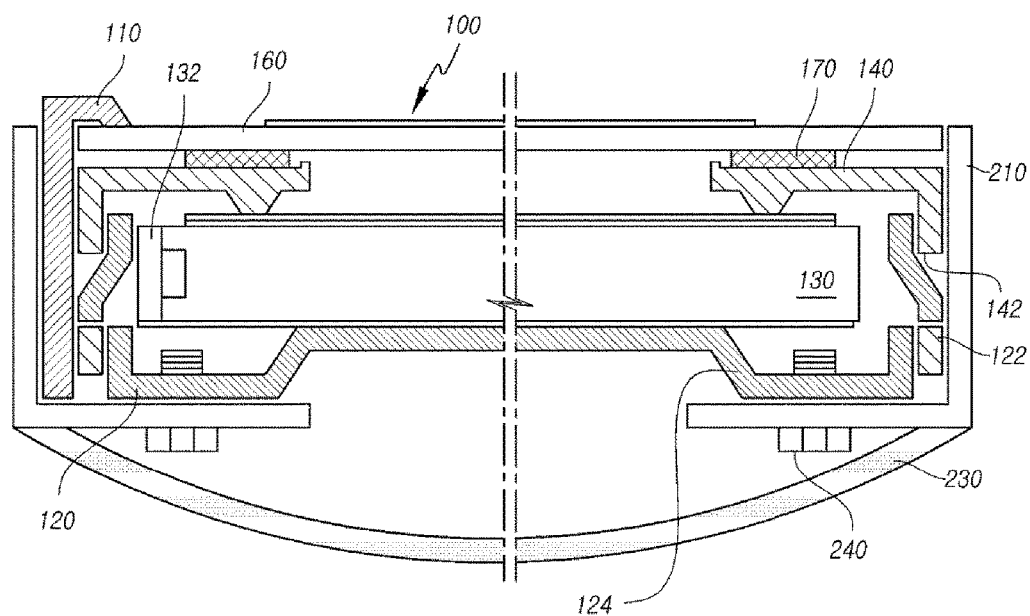
FIGS. 2A and 2B are cross-sectional views illustrating a related art display device and a set electronic device including the same.
Figure 2B:
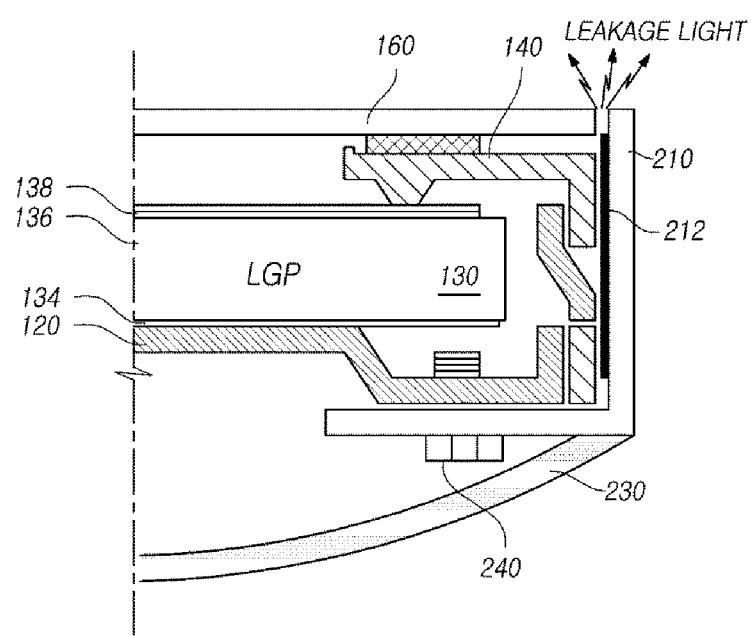

FIGS. 2A and 2B are cross-sectional views illustrating a related art display device and a set electronic device including the same.

As illustrated in FIGS. 2A and 2B, the entire set device assembled as illustrated in FIG. 1 is equipped with the display device 100, the set middle cover 210 that is mounted to enclose the side surfaces and a part of the rear surface of the display device 100, and a set rear cover 230 that covers the entire rear surface of the set device.

Now, the detailed configuration of the display device 100 included in the set device will be described.

The display device includes a display panel 160, such as a liquid crystal display panel, a back light unit 130 that is disposed below the display panel 160 to irradiate light to the display panel, and a cover bottom 120 that is disposed to support the back light unit 130. The cover bottom 120 is made of a metal and extends over the entire rear surface of the display device.

In addition, a guide panel 140 made of a plastic material is disposed to extend between the side surfaces of the cover bottom and a part of the front surface of the back light unit as a structure that connects the back light unit 130 and the display panel 160.

A double-sided adhesive table 170 is attached to a part of the top surface of the guide panel 140, and the display panel 160 is disposed on the double-sided adhesive table 170 so that the display panel can be fixedly mounted.

In addition, the display device may be a so-called edge light source type display device, in which a light source unit 132 is only disposed on one lateral side of the display device 100, and no light source exists on the remaining three sides.

That is, in the case of this type of display device, as illustrated in FIG. 2A, a light source module 132 that constitutes the back light unit 130 may be disposed on one side surface of the display device (left side in FIG. 2A), and no light source is disposed on the other side surface (right side in FIG. 2A).

In such a case, the case top 110, which is made of a metal and extends over the outermost side surfaces of the display device and a part of the front surface of the display panel, may be disposed on the one side where the light source module is typically mounted.

The case top 110 encloses the side portion of the guide panel 140 and extends to a portion of the front side of the display panel 160. Thus, the case top 110 functions to protect the display panel and to protect a chip-on-film (COF) circuit unit which is a connection circuit for connecting a printed circuit board (not illustrated) for driving the display device disposed behind the cover bottom and the display panel.

When the display panel 160 is a liquid crystal display panel, the display panel 160 may include: an array substrate including a plurality of gate lines, a plurality of data lines, a plurality of pixels defined at the intersections of the gate lines and the data lines, and a plurality of thin film transistors, each of which serves as a switching element that controls a light transmittance in each pixel; an upper substrate including, for example, a color filter and/or a black matrix; and a liquid crystal material layer formed between the array substrate and the upper substrate.

Meanwhile, a display panel, to which the present invention is applicable, is not limited to the liquid crystal display panel, and may also include a self-glowing display device, such as an OLED, as well as a display device, such as a plasma display.

As illustrated in FIGS. 2A and 2B, the back light unit 130 used for a liquid crystal display device, to which an embodiment of the present invention is applicable, may include sub-units as follows: a light source module 132 including, for example, a light source, such as an LED, a holder for fixing the light source, and a light source driving circuit; a light guide plate (LGP) or diffusion plate that diffuses light over the entire panel region; a reflecting plate that reflects light toward the display panel; a LED flexible printed circuit that controls, for example, ON/OFF of the light source; and one or more optical films or sheets disposed on the top of the light guide plate for the purpose of improving brightness, and diffusing and protecting light.

In addition, the cover bottom 120 that constitutes the display device 100 is a member made of a metal. The cover bottom 120 includes a rear portion that supports the entire rear surface of the display device, and a side portion extending from the rear portion to cover a part of the side surface of the back light unit and coupled to a side portion of the guide panel 140.

The guide panel 140 is a plastic structure that is fixedly coupled to the side surfaces of the cover bottom 120, and covers a part of the front surface of the back light unit 130. The display panel 160 is attached to the top side of the guide panel 140.

On the side surfaces of the cover bottom 120, one or more fixing protrusions 122 are formed, and on the side surfaces of the guide panel 140, fixing holes 142 corresponding to the fixing protrusions 122 are formed so that both structures are coupled in the form of a hook coupling, and thus the cover bottom 120 and the guide panel 140 are fixedly coupled to each other. Of course, the fixing protrusion 122 may be formed on the side surface of the guide panel 140 and the fixing holes may be formed on the side surfaces of the cover bottom 120. Further, the outer partition wall 344 may be used rather than the inner partition wall 342.

In addition, a screw 240 is fastened and fixed to screw holes formed through the cover bottom 120 and the set middle cover 210 so as to fix the display device 100 and the set middle cover 210. Thus, a bent portion 124 is formed at a side of the cover bottom 120 to secure a space for accommodating a tip end of the screw. Accordingly, the bottom surface of the cover bottom 120 does not form a plane in its entirety, but has a shape in which an edge region partially protrudes to the outside.

As described above, in the case of the display device 100 illustrated in FIGS. 1 and 2 and the set electronic device including the same, the cover bottom 120 and the side surface of the guide panel 140 outside the cover bottom 120 are fixed by the fixing protrusions 122 and the fixing holes 142 as illustrated in FIG. 2B, in which the fixing holes 142 are through-holes which are not completely blocked by the fixing protrusions 122 so that a part of the light from the back light may leak out therebetween.

The leakage light leaking out through the fixing holes 142 of the guide panel 140 in this way may leak out to the outside of the set device along the space between the side surfaces of the guide panel and the inner surfaces of the set middle cover 210 positioned outside the guide panel. Accordingly, there is a problem in that a so-called "light leakage phenomenon" is generated to allow a user to observe light dimly leaking out along an edge of the set device in a dark environment.

To prevent the light leakage phenomenon, a light blocking tape 212 should be further formed on the inner surface of the side wall of the set middle cover 210, thereby adding another portion.

In addition, in the above-described set device of FIGS. 1 and 2, the set middle cover 210 is additionally needed in addition to the display device 100, and a large set rear cover 230 that covers the entire rear surface of the display device. Thus, parts for the set device increase, which causes, for example, an increase in costs and an inconvenience in assembly.

In addition, because the set rear cover 230 should usually be formed as a curved plastic member, the set rear cover 230 occupies a large thickness. Consequently, there was a problem in that the thickness of the set device increases by a maximum of five times the thickness of the display device 100.

In addition, as illustrated in FIG. 2A, the bottom surface of the cover bottom 120 has a shape in which an edge region partially protrudes to the outside, without forming a plane in its entirety, in order to accommodate a part of the screw 240 for fixing the display device 100 and the set middle cover 210. Thus, not only the thickness of the display device 100 increases, but also the external appearance thereof is poor.

Embodiments of the present invention have been made in consideration of the problems described above, and may prevent the light leakage phenomenon by forming the guide panel of the display device using a dual partition wall and a first extension that extends at a side of the display panel, and coupling the inner partition wall and the cover bottom using a hook structure so that an outer partition wall provides a light blocking function.

In addition, one embodiment of the prevent invention allows the outer surface of the outer partition wall of the guide panel and the outer surface of the first extension to directly form a side exterior portion of the set electronic device so that not only the set middle cover of the existing set electronic device can be removed, but also the size of the set rear cover can be reduced.

Hereinafter, detailed configurations of a display device according to a embodiments of the present invention and a set device including the display device will be described with reference to FIGS. 3 to 8.

Figure 3:
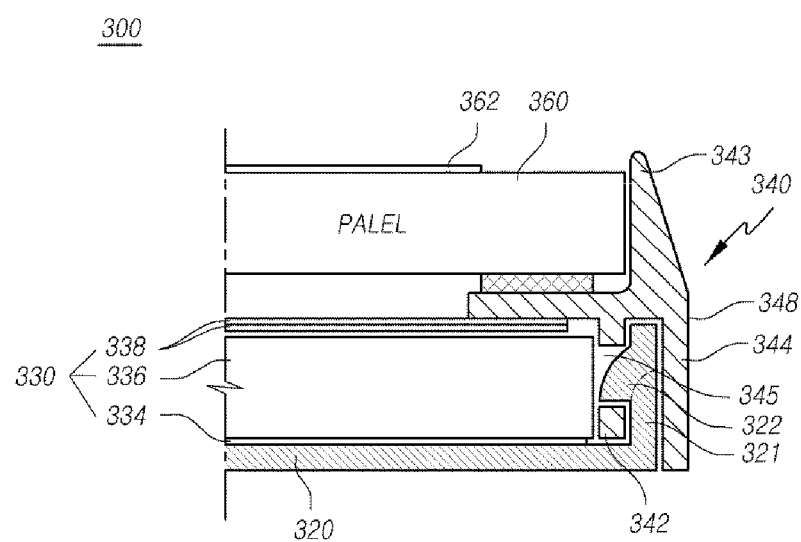
FIG. 3 is a cross-sectional view illustrating a display device according to one embodiment of the present invention in an enlarged scale.

FIG. 3 is a cross-sectional view illustrating a display device according to an embodiment of the present invention in an enlarged scale.

A display device according to an embodiment of the present invention includes a display panel 360, a back light unit 330 that provides light to the display panel, a cover bottom (or back cover) 320 that supports a part of the back light unit, and a guide panel 340 that is connected with the cover bottom.

In particular, the display device of the embodiment of the present invention is characterized by the shapes of the guide panel 340 and the cover bottom 320. Specifically, the guide panel 340 has a dual partition wall structure including an inner partition wall 342 and an outer partition wall 344 that extend in parallel with a side surface of the back light unit, and a first extension 343 extending at a side of the display panel integrally with the dual partition wall structure so as to completely cover the side surface of the display panel 360.

In addition, the guide panel 340 includes a second extension 346 formed at a bottom side of the display panel to protrude in a direction perpendicular to the dual partition wall structure and the first extension 343.

The bottom of the second extension 346 is in contact with the top portion of the back light unit 330, i.e., the top of an optical sheet, so as to support the back light unit, and the top portion of the second extension 346 is in contact with the bottom surface of the display panel 360 so as to support the display panel. More specifically, a double-sided adhesive tape is disposed on the top portion of the second extension 346, and the display panel 360 is adhered to and fixed to the top portion of the double-sided adhesive tape.

In addition, the cover bottom 321 includes a side portion 321 extending perpendicularly from a main portion of the cover bottom 320. The side portion 321 is inserted between the inner partition wall 342 and the outer partition wall 344 of the guide panel 340, and fixedly coupled to the inner partition wall 342 of the guide panel by a hook structure.

The hook structure will now be described in more detail. As illustrated in FIG. 3, one or more fixing protrusions 322 are formed on the side portion 321 of the cover bottom 320, and fixing holes 345 corresponding to the fixing protrusions are formed on the inner partition wall 342 of the guide panel 340. Accordingly, when the fixing protrusions 322 of the cover bottom are hooked to the fixing holes 345 of the inner partition wall 342 of the guide panel, the cover bottom 320 and the guide panel 340 are fixedly coupled to each other.

Of course, the hook structure is not limited to the type or configuration illustrated in FIG. 3. For example, one or more fixing protrusions may be formed on the inner partition wall 342 of the guide panel, and the fixing holes corresponding to the fixing protrusions may be formed on the side portion 321 of the cover bottom 320.

With this configuration, as will be described in detail below, the outer surface 348 of the guide panel formed by the outer surfaces of the outer partition wall 344 and the first extension 343 of the guide panel 340 will directly form the side exterior portion of a set electronic device including the display device.

Accordingly, the set middle cover 210 (see FIGS. 1 and 2) that encloses and protects the side surfaces of the display device when a set device including the display device is configured as illustrated in FIGS. 1 and 2 becomes unnecessary.

In addition, since the guide panel is formed as a dual partition wall structure and the cover bottom is coupled to the inner partition wall thereof, it may not be necessary to form a fixing groove on the outermost side surface of the guide panel as in the related art structure illustrated in FIGS. 1 and 2. Accordingly, the light leakage phenomenon in the outer peripheral portion of the display device, which occurs in the related art structure illustrated in FIGS. 1 and 2, may also be reduced.

That is, in the embodiment of FIG. 3, even if the light of the back light unit partially leaks out through the fixing holes 345 formed on the inner partition wall 342 of the guide panel 340, the light cannot leak out to the outside due to the outer partition wall 344, and as a result, the light leakage phenomenon can be prevented.

In addition, as described above, the existing set middle cover 210 may be omitted due to the guide panel 340. Thus, the screw coupling between the set middle cover and the cover bottom 120 becomes needless.

Accordingly, it is not necessary to bend each side edge of the cover bottom so as to accommodate the tip ends of the screws 240 as illustrated in FIGS. 2A and 2B. Accordingly, as illustrated in FIG. 3, the cover bottom can have a flat structure over the entire rear surface of the display device.

Since the rear surface of the cover bottom can be made to be flat as described above, an excellent appearance can be obtained and the entire thickness of the display device, or the set electronic device, can be reduced.

The first extension 343 of the guide panel 340 is integrally formed with the dual partition wall structure and protrudes toward the front portion of the display device so as to completely cover the side surface of the display panel 360.

As a result, the inner surface of the first extension 343 protects the side surface of the display panel in a state where it is either in contact with or in non-contact with the side surface of the display panel, and the outer surface of the first extension 343 forms the side exterior portion display device 300 as well as the side exterior portion of the set electronic device including the display device.

That is, since the set middle cover 430 (see FIG. 5) is directly mounted on a part of the rear side of the display device 300 without the set middle cover 210 as in the related art illustrated in FIGS. 1 and 2, the outer surface 348 of the guide panel, which is formed by the outer surface of the outer partition wall 344 of the guide panel 340 and the outer surface of the first extension 343, directly forms the side exterior portion of the set electronic device, in place of the set middle cover which has formed the side exterior portion of the existing set electronic device.

Hereinafter, the detailed configuration of the embodiment of the present invention illustrated in FIG. 3 will be described in some more detail.

The display panel 360 used in the embodiment of the present invention may be a liquid crystal display panel but is not limited thereto. The display panel 360 may include all types of display panels, such as a plasma display and an organic light emitting diode (OLED) display panel.

If the display panel 360 according to an embodiment of the present invention is a liquid crystal display panel, the display panel 360 may include: an array substrate including a plurality of gate lines, a plurality of data lines, a plurality of pixels defined at the intersections of the gate lines and the data lines, and a plurality of thin film transistors, each of which serves as a switching element that controls a light transmittance in each pixel; an upper substrate including, for example, a color filter and/or a black matrix; and a liquid crystal material layer formed between the array substrate and the upper substrate. In addition, a touch window 362 may be additionally disposed on the upper front surface of the display panel.

In addition, the back light unit 330 used in the embodiment of the present invention may include, in detail, sub-units as follows: a light source module (not illustrated) including a light source, such as an LED; a light guide plate (LGP) 336 or diffusion plate that diffuses light over the entire panel region; a reflecting plate 334 that reflects light toward the display panel; an LED flexible printed circuit (LED FPC) (not illustrated) that controls, for example, ON/OFF of the light source; and one or more optical films or sheets 338 disposed on the top of the light guide plate for the purpose of improving brightness, and diffusing and protecting light.

The light source module in the embodiment of the present invention may include: a light source element, and a light source holder having an elongated plate structure that supports the light source element and includes an LED drive circuit for supporting the light source element and driving the light source. As for the light source element of the light source module, for example, a light emitting diode (LED) or a light emitting diode strip may be used but is not limited thereto. Any type of light source may be used as long as it can provide light required for the display panel.

The light guide plate (LGP) 336 may be generally die-cut from a plastic sheet or formed of an extruded or injection-molded rectangular transparent plastic sheet. Light from a light source, such as a light emitting diode array, is emitted to an edge of the light guide plate to be diffused across the rear surface of the display panel while being totally reflected within the light guide plate, and the light emitted through the flat top surface of the light guide plate functions as the back light of the display panel.

The reflecting plate 334 is positioned on the rear surface of the light guide plate 336, and functions to improve brightness of light by reflecting light that passes through the rear surface of the light guide plate 336, toward the display panel 360.

The optical sheet 338 on the top of the light guide plate 336 includes a diffusion sheet and at least one condensing sheet, and diffuses or condenses the light passing through the light guide plate 336 so that a more uniform planar light source is incident on the display panel 360.

Meanwhile, one or more chassis may be used as a support structure for mounting and supporting back light units, such as the light source, the reflecting plate, and the light guide plate. The chassis includes a cover bottom 320, which is a frame made of a metal, and covers the entire back light unit at the most rear side, and a guide panel 340, which is a plastic chassis connected with the cover bottom while supporting the display panel at the underside of the display panel.

The cover bottom 320 according to an embodiment of the present invention includes a flat bottom portion that covers the rear surface of the back light unit partially or entirely, and a side portion 321 that is bent at an edge of the bottom surface and extends to a side surface of the back light panel, in which the side portion 321 of the cover bottom 320 is inserted between the inner partition wall 342 and the outer partition wall 344 of the guide panel 340 and fixedly coupled to the inner partition wall 342 of the guide panel by a hook structure.

That is, one or more fixing protrusions 322 are formed on the side portion 321 of the cover bottom 320, and fixing holes 345 corresponding to the fixing protrusions 322 are formed on the inner partition wall 342 of the guide panel 340. Accordingly, the fixing protrusions 322 of the cover bottom are hooked to the fixing holes 345 of the inner partition wall 342 of the guide panel to be fixedly coupled.

In addition, the fixing protrusions 322 of the cover bottom and the corresponding fixing holes 345 of the guide panel 340 may be formed in five to seven pairs at the side of the long side of the display device and three or four pairs at the side of the short side of the display device, but are not limited thereto. There is no limit in the number and size of the fixing protrusions and fixing holes as long as the cover bottom and the guide panel can be rigidly coupled with each other.

The cover bottom 320 in the present specification may be referred to by other terms, such as base frame, metal frame, metal chassis, and chassis base, and may be defined as a frame or plate shape structure that is formed of a metal or the like and disposed at the lowest base portion of the display device as a support for fixing one or both of the display panel and the back light unit.

In addition, the guide panel 340 in the present specification may be referred to by other terms, such as a plastic chassis, a p-chassis, a support main, a main support, and a mold frame. The guide panel 340 may include all the types of plastic members used for supporting the back light, the display panel, etc. by being connected to the cover bottom 320 as a rectangular frame-shaped structure having a cross-sectional shape having a plurality of bent portions.

The guide panel 340 may be formed of a mold material of a synthetic resin such as polycarbonate and fabricated through an injection molding process, but it is not limited thereto.

Figure 4:
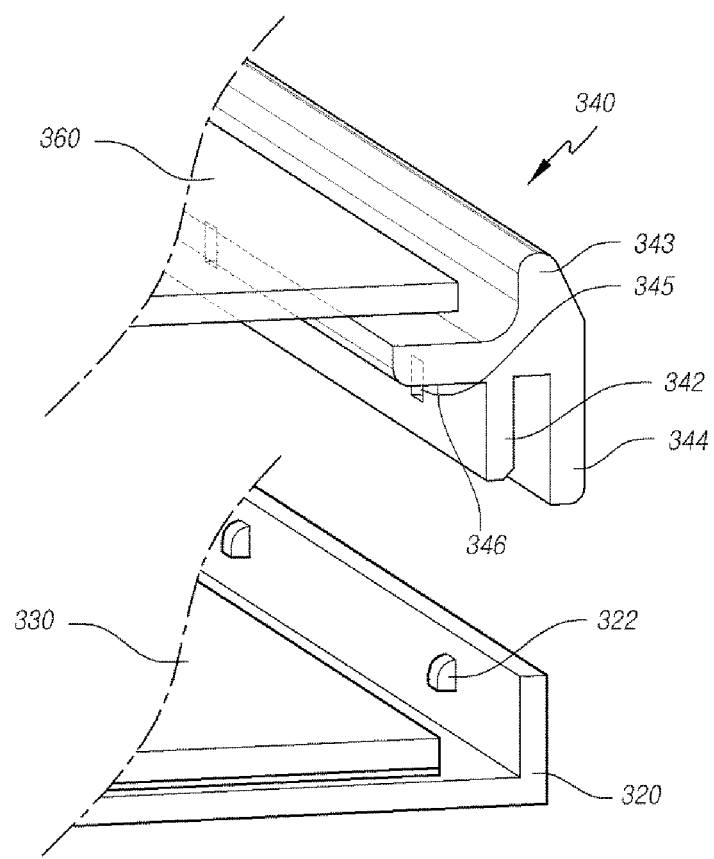
FIG. 4 is an exploded perspective view illustrating a part of a display device according to one embodiment of the present invention.

FIG. 4 is an exploded perspective view illustrating a part of a display device according to one embodiment of the present invention.

As illustrated in FIG. 4, when the display device is disassembled, a support frame is formed by the lowermost cover bottom 320 and the guide panel 340 coupled thereto, the back light unit 330 is disposed above the cover bottom, and the display panel 360 is mounted in the space formed by the top of the second extension 346 of the guide panel and the first extension 343.

At this time, the side portion of the guide panel 340 includes an inner partition wall 342 and an outer partition wall 344, in which the inner partition wall 342 is formed with a plurality of fixing holes 345, into which the fixing protrusions 322 formed on the side portion of the cover bottom 320 are received.

When the display device is fabricated in this manner, the side surface of the outer partition wall 344 of the guide panel 340 and the side surface of the first extension 343 form the outer peripheral portion of the display device with a smooth appearance, and consequently form the entire peripheral exterior portion of the set device even after the display device is mounted.

Meanwhile, since the light source module should be disposed on one of four sides of the display device or the set device and the COF should extend from the circuit board disposed on the rear surface of the display device, a case top 110 (see FIG. 1) should be used as a member for protecting them.

Even though an embodiment of the present invention is applied, the structure of the guide panel and the cover bottom according to present invention may not be properly applied to the side where the light source module and the COF are connected.

Thus, according to the embodiment of the present invention, the hook connection structure between the dual partition wall structure of the guide panel 340 and the cover bottom, the first extension 343 that directly forms the exterior portion of the set device, etc. may be applied to only three sides among the entire four sides of the display device.

That is, in the guide panel and the cover bottom according the embodiment of the present embodiment, the hook connection structure between the dual partition wall structure of the guide panel 340 and the cover bottom, the first extension 343 that directly forms the exterior portion of the set device, etc. as described above, may be formed on only three sides, except for the side where the light source module and the COF are disposed, and on the side where the light source module and the COF are disposed, the related art structure may be used.

Figure 5A:
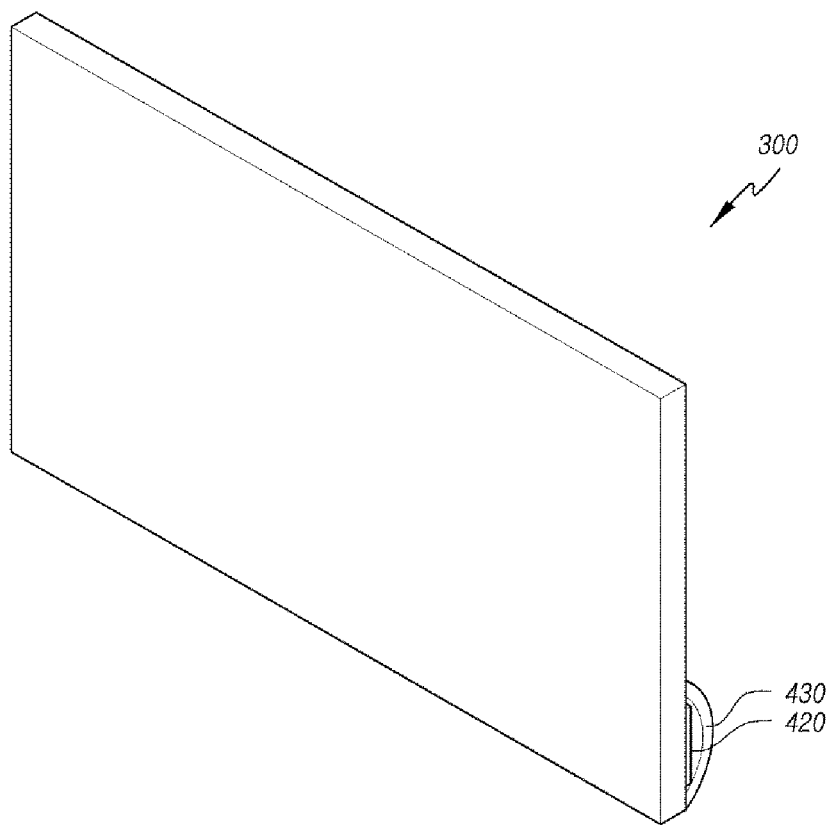
Figure 5B:
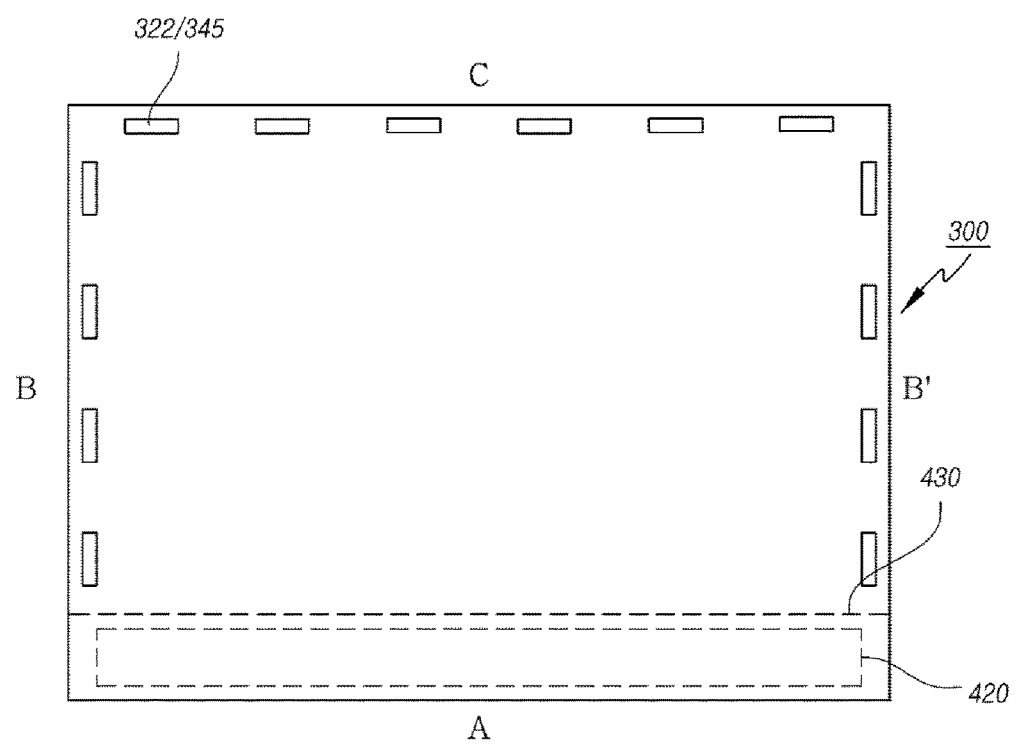
Figure 6A:
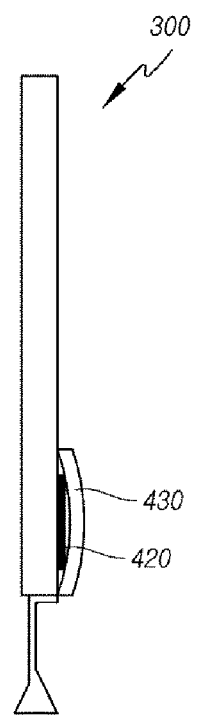
FIGS. 6A and 6B are side views illustrating a display device according to an embodiment display unit and a related art display device in comparison.
Figure 6B:
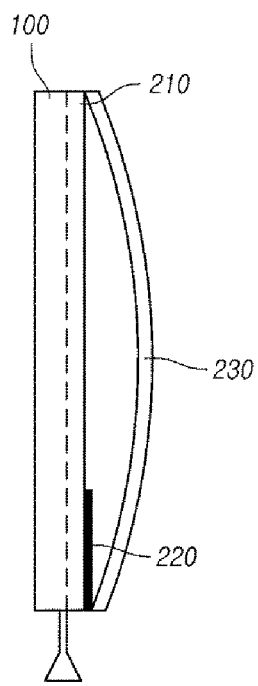

FIGS. 5A and 5B are views illustrating a set electronic device according to an embodiment of the present invention, in which FIG. 5A is a perspective view and FIG. 5B is a plan view, and FIGS. 6A and 6B are side views illustrating a display device according to an embodiment and a related art display device in comparison.

As illustrated in FIGS. 5A and 5B, according to an embodiment of the present invention, the set electronic device may include a display device 300 as illustrated in FIG. 3, a set drive circuit frame 420 mounted on a partial area of the rear surface of the display device, and a set rear cover 430 coupled to the rear side of the display device so as to cover only the rear area of the display device 300 where the set drive circuit frame 420 is mounted.

The set device according to the embodiment of the present invention includes an exterior portion, which is directly formed by the side portion of the guide panel that forms the display device 300 without using the set middle cover 210 of the related art illustrated in FIG. 2. Further, although the set rear cover 430 has been formed to cover the entire rear surface of the device in the related art, in an embodiment of the present invention, the set rear cover 430 covers only a part of the rear surface of the display device.

That is, in the related art structure illustrated in FIG. 6B, in addition to the display device 100, the set middle cover 210 is used, and the set rear cover 230 covers the rear surface of the display device. Thus, there is a disadvantage in that the number of parts increases and the entire thickness of the set device is thick.

Meanwhile, according to an embodiment of the present invention, as illustrated in FIG. 6A, the set middle cover 210 (see FIGS. 2A and 2B) is not used, and the side portion of the guide panel that constitutes the display device 300 directly forms the exterior portion of the set device, and the set rear cover 430 also is in the form of covering only a part of the rear surface of the display device, that is, the set drive circuit frame 420. Thus, the number of entire parts of the set device and the entire thickness of the set device are reduced.

In addition, as described above, among the four sides A, B, B', and C of the display device, the hook connection structure between the dual partition wall structure of the guide panel 340 and the cover bottom according to the embodiment of the present invention may be formed only on three sides B, B', and C, except for the side A where the set drive circuit frame 420 is disposed. That is, the inventive structure may not be applied to the side or edge where the light source of the display device and the COF as well as and the set drive circuit 420 are disposed.

Accordingly, FIG. 5B illustrates that the pairs of the fixing protrusions 322 of the cover bottom 320 and the fixing holes 345 of the guide panel inner partition wall 342 may be formed only on the sides B, B', and C. Meanwhile, FIG. 5B illustrates that six hook structures (the fixing protrusions of the cover bottom and the fixing holes of the guide panel) may be disposed on the long side C of the set device, and four hook structures may be disposed on each of the short sides B and B'.

Figure 7:
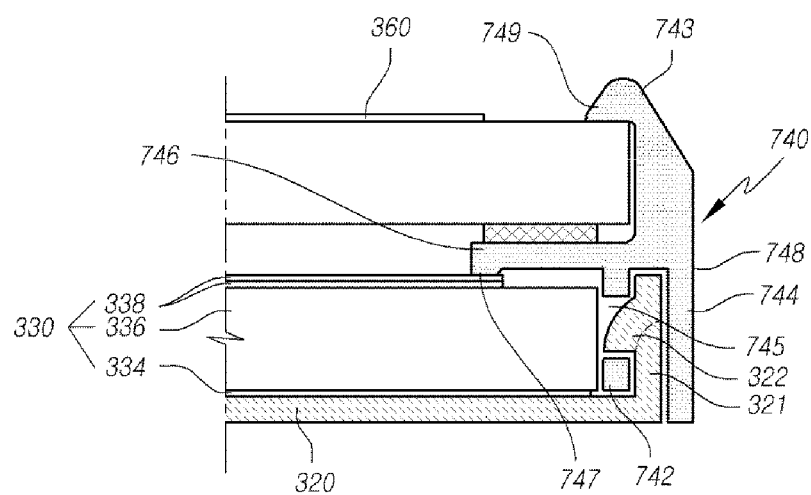
FIG. 7 is a cross-sectional view illustrating a display device according to another embodiment of the present invention in an enlarged scale.

FIG. 7 is a cross-sectional view illustrating a display device according to another embodiment of the present invention in an enlarged scale.

When comparing the embodiment illustrated in FIG. 7 with that of FIG. 3, the structures of the cover bottoms are equal to each other, but the embodiment of FIG. 7 further includes a third extension 749 integrally extending at the front side of the display panel 360 from a first extension 743 of the guide panel 740 to cover a part of the display panel 360.

That is, as in the embodiment of FIG. 3, the guide panel 740 according to the embodiment of FIG. 7 includes a dual partition wall structure including an inner partition wall 742 and an outer partition wall 744, the first extension 743 is formed to extend integrally with the dual partition wall structure to completely cover a side surface of the display panel 360, the fixing holes 745 corresponding to the fixing protrusions of the cover bottom 320 are formed on the inner partition wall 742 of the guide panel 740, and as an additional configuration, the third extension 749 integrally extends from the first extension 743 to cover a part of the front surface of the display panel 360.

The third extension 749 covers and protects a part of the edge of the front surface of the display panel, and is provided so as to further strengthen the protection function for the front surface of the display panel when the guide panel 740 performs as the outermost portion of the display device or the set device.

In addition, in the embodiment of FIG. 7, a back light support protrusion 747 may be additionally formed at an end of the second extension 746 of the guide panel 740 so as to compress and support the optical sheet of the back light unit.

Figure 8A:
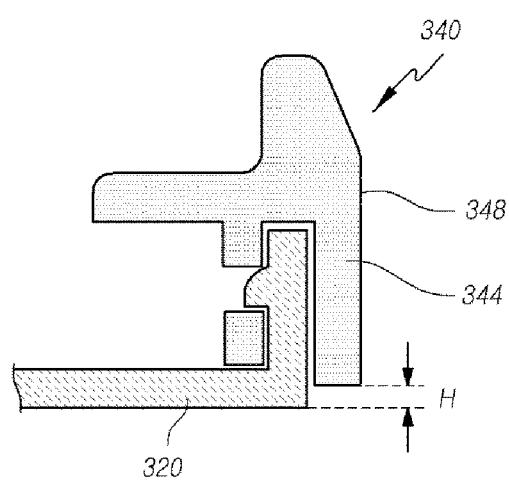
FIGS. 8A and 8B are views illustrating a positional relationship between a guide panel and a cover bottom according to one embodiment of the present invention.
Figure 8B:
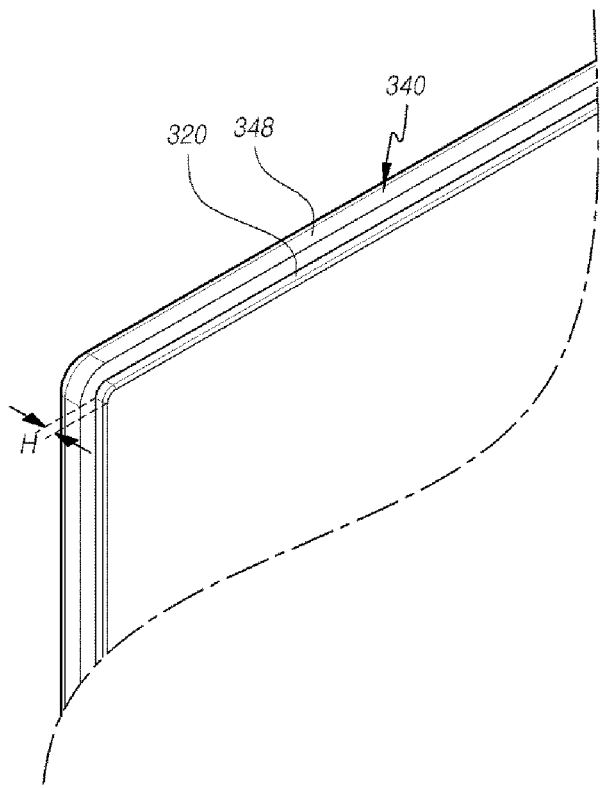

FIGS. 8A and 8B are views illustrating a positional relationship between a guide panel and a cover bottom according to one embodiment of the present invention.

In the state where the guide panel 340 and the cover bottom 320 are coupled to each other as illustrated in FIG. 4, the rear surface of the cover bottom 320 may protrude more outwardly than the end of the outer partition wall 344 of the guide panel 340.

That is, as illustrated in FIG. 8A, assuming that the distance between the tip end of the outer partition wall 344 of the guide panel 340 and the outer surface of the cover bottom 320 is H, H may be about zero so that the guide panel and the outer peripheral portion of the cover bottom forms the same plane. However, in embodiments of the present invention, H may have a value larger than zero for beauty in appearance and as a result, the rear surface of the cover bottom 320 is adapted to protrude more outwardly than the end of the outer partition wall 344 of the guide panel 340.

Accordingly, in the state where the display device is assembled to the set device, as illustrated in FIG. 8B, the side portion 348 of the guide panel 340 configures the entire side exterior portion of the set device, the side surface of the cover bottom 320, which protrudes from the side portion 348 of the guide panel 340 by H, forms a part of the side exterior portion of the set device, and the rear surface of the cover bottom 320 constitutes the entire rear surface of the set device.

As described above, according to embodiments of the present invention, the guide panel of the display device is configured with the dual partition wall and the first extension extending at a side of the display panel, and a hook structure is formed between the inner partition wall of the dual partition walls and the cover bottom so that both members are coupled to each other. As a result, the light leakage phenomenon can be prevented by the outer partition wall and the first extension that extends at the side of the display panel.

Further, since the outer surface of the outer partition wall of the guide panel and the outer surface of the first extension directly constitute the side exterior portion of the set electronic device including the display device, it may be possible to omit the set middle cover of the related art set electronic device may be emitted, and the size of the set rear cover may be reduced. Thus, the structure can be simplified, the cost of a product can be reduced, and the assemblability of the product can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A display device, comprising:
   a display panel;
   a back light unit configured to provide light to the display panel; and
   a guide panel covering side surfaces of the display panel and the back light unit, such that the guide panel includes:
      a dual partition wall structure of an inner partition wall and an outer partition wall,
      a first extension that is extending from and integral with the dual partition wall structure, and
      a second extension protruding in a direction perpendicular to the dual partition wall structure to be between the back light unit and the display panel; and
   a back cover supporting the back light unit;
   wherein the back cover includes a main body portion and a side portion extending perpendicularly from the main body portion, and the side portion is inserted between the inner and outer partition walls of the guide panel to connect the back cover to the guide panel, wherein the side portion includes one or more protrusions and the inner partition wall includes one or more fixing holes such that positions of the protrusions and the fixing holes are corresponded to couple the back cover to the guide panel, thereby an outer surface of the outer partition wall of the guide panel defines an exterior side surface of the display device.

2. The display device according to claim 1, wherein the outer partition wall is parallel with and adjacent to side surfaces of the back light unit.

3. The display device according to claim 1, wherein the first extension is adjacent to side surfaces of the display panel.

4. The display device according to claim 1, wherein a first surface of the second extension is in contact with a front of the back light unit, and a second surface of the second extension is in contact with a back of the display panel.

5. The display device according to claim 4, wherein a double-sided adhesive tape is on the second surface of the second extension to adhere the display panel to the guide panel.

6. The display device according to claim 4, wherein the display panel is positioned by the first and second extensions.

7. The display device according to claim 1, wherein the back light unit is positioned by the second extension, the inner partition wall, and the back cover.

8. The display device according to claim 1, wherein the back cover directly attaches to the guide panel.

9. The display device according to claim 1, wherein a rear surface of the back cover protrudes more outwardly than an end of the outer partition wall.

10. The display device according to claim 1 wherein a rear surface of the back cover is even with an end of the outer partition wall.

11. The display device according to claim 1, wherein the first extension includes a portion that covers a front surface of the display panel.

12. A set electronic device, comprising:
    a display device including:
       a display panel,
       a back light unit configured to provide light to the display panel,
       a guide panel covering side surfaces of the display panel and the back light unit, such that the guide panel includes a dual partition wall structure of an inner partition wall and an outer partition wall, a first extension that is extending from and integral with the dual partition wall structure, and a second extension protruding in a direction perpendicular to the dual partition wall structure to be between the back light unit and the display panel, and,
       a back cover supporting the back light unit;
    a set drive circuit frame mounted on a portion of a rear surface of the display device; and
    a set rear cover coupled to the rear side of the display device and configured to cover the portion where the set drive circuit frame is mounted;
    wherein the back cover includes a main body portion and a side portion extending perpendicularly from the main body portion, and the side portion is inserted between the inner and outer partition walls of the guide panel to connect the back cover to the guide panel,
    wherein the side portion includes one or more protrusions and the inner partition wall includes one or more fixing holes such that positions of the protrusions and the fixing holes are corresponded to couple the back cover to the guide panel, thereby an outer surface of the outer partition wall of the guide panel defines an exterior side surface of the display device.

13. The set electronic device according to claim 12, wherein the display panel is positioned by the first and second extensions, and the back light unit is positioned by the second extension, the inner partition wall, and the back cover.

* * * * *